United States Patent [19]

Sturgill

[11] 4,263,979

[45] Apr. 28, 1981

[54] HYDRAULIC MASTER-SLAVE STEERING SYSTEM FOR A WIDE TRACK VEHICLE

[75] Inventor: James D. Sturgill, Roxboro, N.C.

[73] Assignee: RPC Corporation, Roxboro, N.C.

[21] Appl. No.: 959,057

[22] Filed: Nov. 9, 1978

[51] Int. Cl.³ .............................................. B62D 5/04
[52] U.S. Cl. ................................... 180/79.1; 180/142; 280/91
[58] Field of Search ............... 180/140, 141, 142, 132, 180/79.1, 236, 234, 242

[56] References Cited

U.S. PATENT DOCUMENTS

| | | | |
|---|---|---|---|
| 3,387,684 | 6/1968 | Belke | 180/140 |
| 3,532,178 | 10/1970 | Lindbom | 180/140 |
| 3,572,458 | 3/1971 | Tax | 180/79.1 |
| 3,596,730 | 8/1971 | Cecce | 180/140 X |

OTHER PUBLICATIONS

Grad-Line Brochure Form #0100-018, Aug. 1976.

*Primary Examiner*—John P. Silverstrim
*Attorney, Agent, or Firm*—John H. Mulholland; Bruce M. Winchell

[57] ABSTRACT

An electro-hydraulic steering system is disclosed for a wide track steerable vehicle which changes the position of each steerable slave wheel to an optimum angle depending on the angle of a hydraulically steerable master wheel. Controls, including electro-hydraulic steering mechanisms, are provided to cause the steerable slave wheels to turn relative to one another to assume and maintain an optimum turning radius and optimum turning relationship as the vehicle operator maneuvers the vehicle along a desired curved path of travel by hydraulically controlling a master steerable wheel. The system minimizes tire wear, reduces structural stresses in the vehicle, and maximizes traction during turning maneuvers. No conventional tie rods are required and the system may be implemented to permit two wheel steering, four wheel crab steering, and four or more wheel coordinated steering. The system uses a position sensor on the hydraulically steerable master wheel to produce a signal to control the positioning of the slave wheels. The signal is digitized to produce a signal which, when compared to a position signal from a position sensor for each slave wheel, causes each slave wheel to assume an optimum position which is about perpendicular to the turning radius of the vehicle.

4 Claims, 10 Drawing Figures

HYDRAULIC MASTER-SLAVE STEERING SYSTEM FOR A WIDE TRACK VEHICLE

BACKGROUND OF THE INVENTION

This invention relates to electro-hydraulic steering systems for wide track vehicles such as straddle cranes which have two or more steerable wheels connected to the vehicle frame. Although it is not uncommon for such vehicles to use hydraulic steering and propulsion or motive force controls, prior art systems often do not provide the necessary means for maintaining optimum turning radii for the steerable wheels when the vehicle operator is attempting to maneuver the vehicle along a curved path. Such prior art systems are not easily adaptable for use with two wheel steering, four wheel crab steering, and four or more wheel coordinated steering, particularly when conventional tie rods or four bar linkage systems are used.

In large, wide track vehicles, particularly those of the straddle crane type such as used to carry heavy or awkwardly sized loads, the visual attention of the operator is often fully occupied during vehicle maneuvers with the need to observe clearances to prevent collisions with obstacles close to the desired path of vehicle travel. Accordingly, it is essential that the steering controls provided to the vehicle operator be simple and be adaptable to achieve optimal vehicle control while requiring minimum attention or inputs from the operator. In particular, it is desirable for vehicles of the type described to permit the operator to control a single wheel and to provide a mechanism which automatically steers the remaining wheels accordingly.

The prior art has produced several systems which provide a control mechanism for accurate tracking by the wheels of a multi-wheel vehicle under the control of a single operator. For example, U.S. Pat. No. 3,387,684 discloses an electronic steering apparatus which generates electrical signals corresponding to the selected direction of travel. A wheel control system responds to the electrical signals to attempt to maintain each wheel normal to the turning radius. A mechanical linkage controlled by an electro-hydraulic cylinder thus operates to control tracking of a wheel. Similarly, U.S. Pat. No. 3,532,178 discloses a system for steering independently steerable wheels of a vehicle in response to the rotation of the steering wheel or other control member to provide the desired steering geometry. In addition, U.S. Pat. No. 3,572,458 discloses a system for individually steering all wheels of a heavy vehicle by use of a cam-controlled servo transmitter.

Nevertheless, it has remained a problem in this art to provide a steering system which electro-hydraulically steers a plurality of automatically steered wheels while eliminating complex mechanical linkages for the steerable wheels, such as tie rods, four bar linkages and the like. Moreover, it is desirable to provide a steering system which is electro-hydraulically responsive to cause the steerable wheels to assume an optimum turning position.

Accordingly, it is an object of the invention to provide a hydraulic steering system for a wide track vehicle wherein automatic control means are provided to cause the slave steerable wheels to turn appropriately relative to one another and relative to the vehicle frame during a turning maneuver in response to the position of a master steerable wheel so that optimum wheel angularity will be maintained for all turning wheels to minimize tirescuffing, optimize wheel traction, and reduce frame stress.

It is another object of the invention to provide automatic control means for incremental control of the relative position of the steerable wheels of the vehicles during a turning maneuver to achive an optimum turning condition for all wheels as a function of the position of a master steerable wheel and the position of a slave wheel.

It is a still further object of this invention to provide for the foregoing with a relatively simple and cost effective system which requires a minimal amount of manual operator attention for effective operation and avoids tie rods and mechanical linkage components.

These and other objects, aims and objectives of this invention will become apparent from a review of the following written description of the invention taken in conjunction with the accompanying drawings.

BRIEF SUMMARY OF THE INVENTION

Toward the fulfillment of these and other objects, a wide track vehicle having two or more steerable wheels connected to the vehicle frame includes means for electrohydraulically steering the vehicle along a curved path by electro-hydraulic steering means. The electro-hydraulic system preferably utilizes a rotatable potentiometer mounted over the caster of each steerable wheel as a wheel angle sensor. The analog signals from the wheel angle sensors of all casters are fed into an electronic control circuit. If the signals do not compare favorably, an error signal is induced, thereby causing the servo valves to correct accordingly to operate hydraulic motors on each respective wheel. The machine operator is actually steering or has control of only one steerable wheel. All other wheels are "slaves" of the one master steerable wheel and controlled by electronic circuitry.

The steering system according to the invention comprises at least two steerable wheels connected to a vehicle frame for a wide track vehicle. Means are provided for electrohydraulically steering the vehicle along a curved path. One of the steerable wheels is hydraulically steered upon command by the operator of the vehicle and is hereinafter referred to as the "master" steerable wheel. The remaining steerable wheels, whether a single wheel in a two steerable wheel vehicle, three wheels in a four wheel vehicle, or n−1 wheels in n−wheel vehicle, are hereinafter designated as "slave" steerable wheels.

The system includes a plurality of wheel angle sensors, one associated with each of the steerable vehicle wheels. Each wheel angle sensor comprises a potentiometer which produces an analog electrical signal representative of the angular position of a wheel relative to a reference position. The wheel angle sensor is mounted on the caster of each steerable vehicle and has a fixed portion and a rotatable portion. The rotatable portion rotates together with the frame of the steerable wheel in order to sense the angular position of the steerable wheel.

Electronic control means are provided for receiving each of the analog signals from the wheel angle sensors. The analog signal representing the wheel position of each steerable slave wheel is compared with a signal representative of the angular position of the master wheel to generate an error signal for driving a servo motor to adjust the angular position of each respective slave wheel. In operation, the analog output signal from the master wheel sensor is digitized and provided to a read only memory which includes data for providing a signal which, when converted to an analog signal and fed to the electronic control circuitry, produces the appropriate error signal for the drive member. Such electronic control circuits are commercially available. The electronic control circuit is adapted for front wheel steering, coordinated steering, or crab steering and the various inputs are adjusted accordingly.

According to the foregoing, each of the slave wheels is thus positionally adjusted in response to the positioning of a master wheel in a multi-wheel vehicle for steering electrohydraulically while avoiding extensive mechanical linkage.

DETAILED DESCRIPTION OF THE PREFERRED EMBODIMENTS

Figure 1:
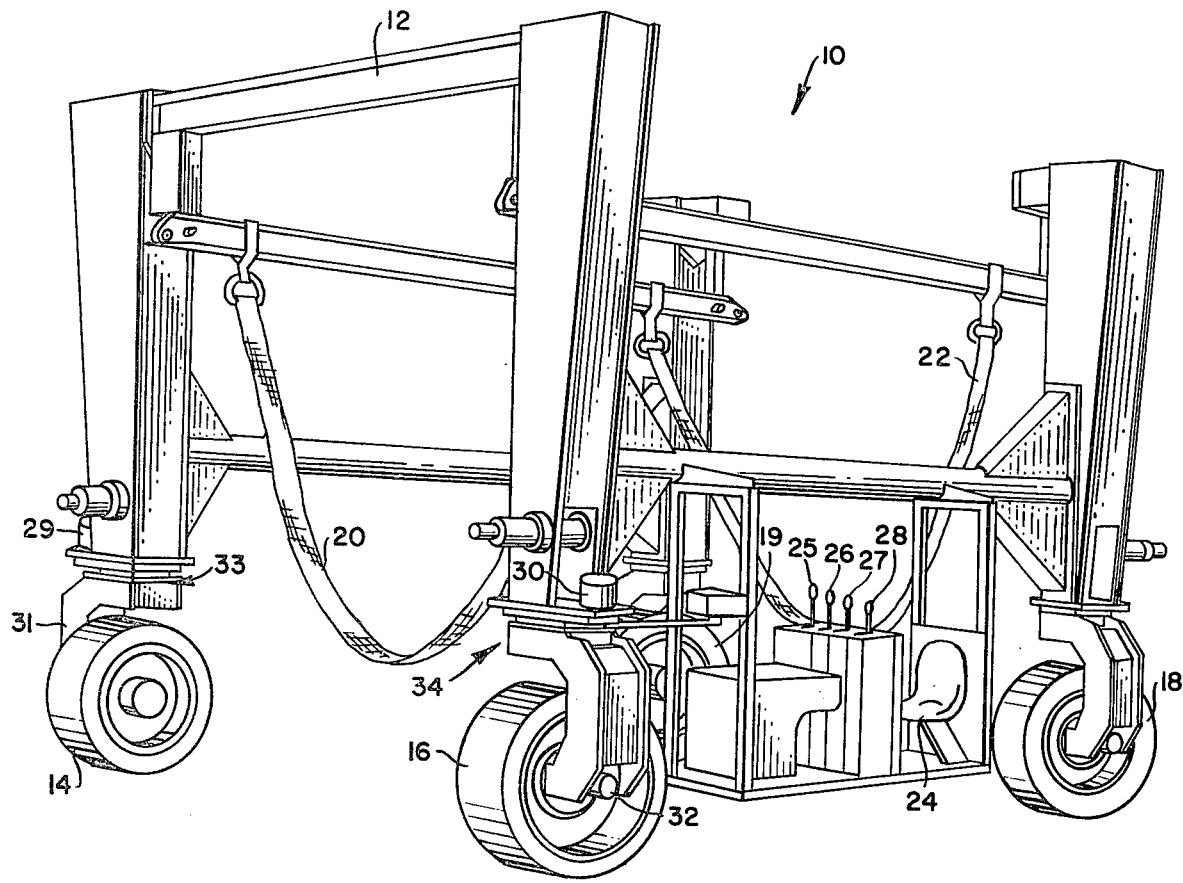
FIG. 1 is a perspective view of a wide track straddle crane vehicle of a type with which a hydraulic steering system according to the present invention may be advantageously used.

In FIG. 1 a wide track vehicle, such as a straddle crane vehicle 10, having a frame 12, is shown with an operator station or seat 24 for an operator. The straddle crane has a plurality of straps or belts 20, 22 adapted to carry awkwardly shaped or heavy loads (not shown) suspended between and under the vehicle frame 12. The particular straddle crane of FIG. 1 has two front wheels 14 and 16, and two rear wheels 18 and 19, each of which is connected to the frame 12.

The two front wheels 14 and 16 are connected to the frame 12 by means designated by numerals 33 and 34 (the details of which are not shown) which permit those wheels to be turned relative to the frame 12 for purposes of steering and controlling the path of travel of the vehicle 10. This steering function is preferably provided by a hydraulic steering motor 29 for the steerable wheel 14 and by a hydraulic steering motor 30 for the steerable wheel 16. In a preferred embodiment, the motors 29 and 30 cooperate through planetary gear box means (not shown) to a pinion and to other gear means (not shown) to control the steering rotation or turned position of the respective wheels 14 and 16 relative to the vehicle frame.

The steerable wheels 14 and 16 are also provided with a driving motor 31 (blocked in the view of FIG. 1) and 32 respectively. These driving motors control the propulsive or motive force applied to each of the respective wheels to control the forward or reverse driving motion of the vehicle 10. In a preferred embodiment, the driving motors 31 and 32 are preferably hydraulic motors which receive hydraulic flows to cause the vehicle to be propelled and driven along the desired path of travel as controlled by the operator at the operator's station 24 who manipulates a series of operator controls.

It is preferable in a vehicle of the type shown in FIG. 1 to provide a minimum number of controls to be manipulated by the manual operator, because, typically, during maneuvering of the vehicle, the manual operator's attention is continuously required in order to assure that the moving vehicle and the loads extending therefrom are maintaining proper clearances from surrounding obstructions, for example, when maneuvering the straddle crane within an industrial plant. A minimum set of operator controls shown as control levers 25, 26, 27 and 28 in FIG. 1 comprise, for example, a steering mode selector lever, a forward-neutral-reverse selector lever, and a steering control lever, and a hoist control lever. The operation of these controls according to the hydraulic steering system of the present invention will be further explained in detail.

Figure 2:
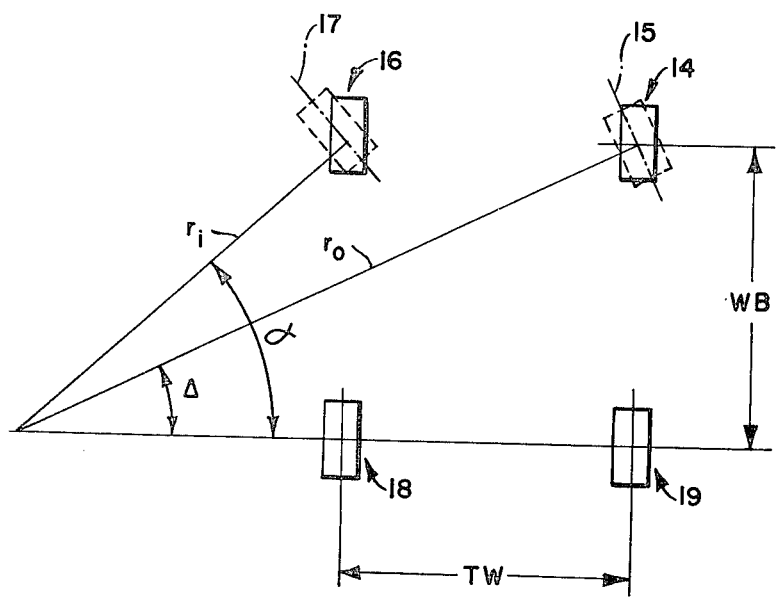
FIG. 2 is a wheel-turning diagram, labeled with certain dimensional parameters helpful for an understanding of the optimum turning conditions of the present invention.

FIG. 2 is a diagram which illustrates a vehicle such as the vehicle 10 of FIG. 1 in a turning maneuver. The wheel positions of the wheels 14, 16, 18 and 19 of the vehicle 10 are shown, and it is seen that the steerable wheels 14 and 16 are turned to the left such as would occur if an operator were attempting to maneuver the vehicle 10 along a path curving leftwardly. The dimension TW shown in FIG. 2 designates the track width and the dimension WB designates the wheel base for the vehicle.

The line labeled $r_i$ in FIG. 2 connected to the steerable wheel 16 and forming an angle $\alpha$ with the line through the two rear wheels 18 and 19 designates the turning radius of the steerable wheel 16 which is on the inside of the leftward turn which would be negotiated by the vehicle 10 with its wheels positioned as shown in FIG. 2. Similarly, the line labeled $r_o$ forming the angle $\Delta$ with the line through the two rear wheels 18 and 19 designates the turning radius of the wheel 14 which, as shown in FIG. 2, is on the outside of the turn.

Preferably, the optimum position of the wheels 14 and 16 during a turning maneuver is when the wheels 14 and 16 assume and maintain their axes of travel, respectively designated by the lines 15 and 17, normal to the radii $r_i$ and $r_o$. When the wheels 14 and 16 are individually steerable, it is thus desirable to achieve this optimum turning position throughout the turning maneuver.

For the preferred embodiment described in this specification, the right front wheel 14 will be the "master" steerable wheel while all other steerable wheels (only wheel 16 in FIG. 2) will be slave wheels. A basic purpose of this invention, therefore, is to cause the slave steerable wheel 16 to assume the optimum steering angle according to the position assumed by the master steerable wheel 14. As will be seen, steering control by the operator is directed only to the master steerable wheel 14.

Figure 3:
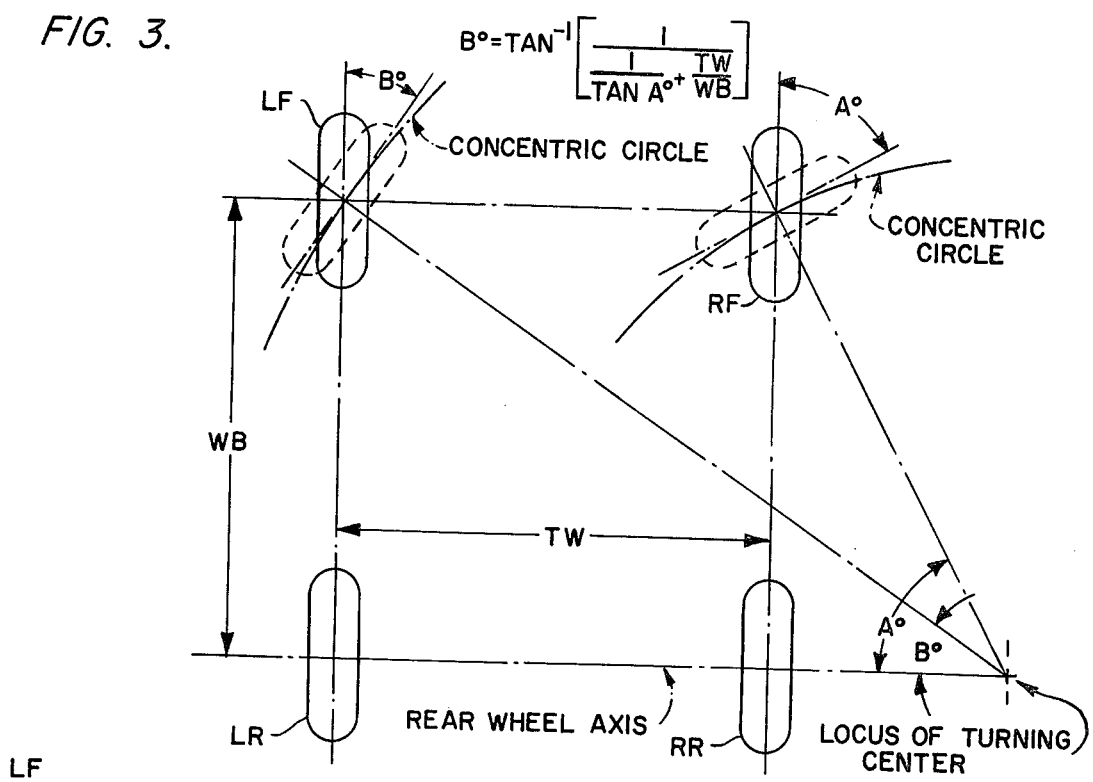
FIG. 3 is a wheel-turning diagram similar to FIG. 2 further illustrating the geometry of two-wheel steering according to the invention in a vehicle of the type described.
Figure 4:
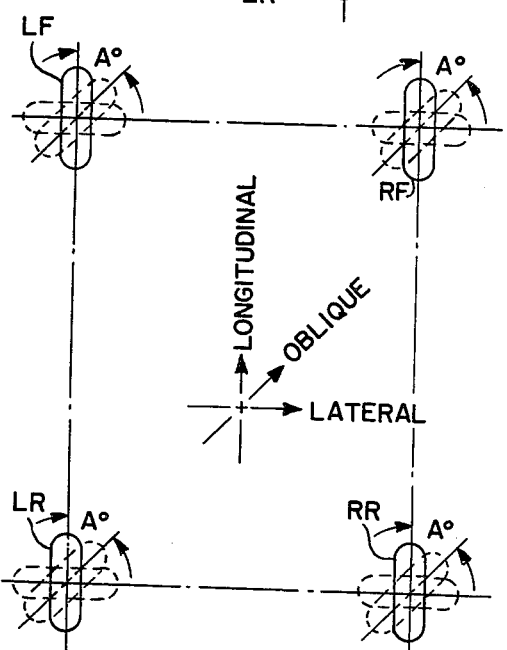
FIG. 4 is a wheel-turning diagram similar to FIG. 3 but illustrating the geometry of four-wheel crab steering according to the invention in a vehicle of the type described.

FIG. 3 is a wheel-turning diagram similar to the wheel-turning diagram of FIG. 2 further illustrating the geometry of two-wheel steering. Wheel LF of FIG. 3 corresponds to the slave steerable wheel 16 of FIG. 2 (i.e., the front left wheel) and wheel RF corresponds to the master steerable wheel 14 (i.e., the right front wheel) of FIG. 2. As in the case of FIG. 2, the rear wheels LR (i.e., left rear) and RR (i.e., right rear) in FIG. 4 are shown with a zero steering angle relative to the vehicle frame. As will be further explained, it is, however, possible that the wheels LR and RR in fact also may be slave steerable wheels, but that when the two-wheel steering mode is selected, that the rear wheels LR and RR will be locked or maintained in a zero or "straight ahead" steering angle, or at the fixed angular position.

As further shown in FIG. 3, the slave steerable wheel LF on the outside of a right-hand turn forms an angle B relative to the vehicle frame, and the master steerable wheel RF on the inside of a right turn forms an angle A relative to the vehicle frame as shown by the alternative turned position for the steerable wheels LF and RF in FIG. 3. For optimum turning of the two steerable wheels, angle A and angle B according to the Ackerman principle of steerng must be appropriately maintained so that concentric circles passing through a common turning center are tangent, repectively to centerlines through each of the steerable wheels LF and RF as shown.

More simply stated, the axis of travel of the wheel is normal to the line passing through the center of the wheel and the locus of the turning center.

FIG. 4 is a wheel-turning diagram similar to that of FIG. 3, but instead illustrates the geometry of so-called four-wheel crab steering. As shown in FIG. 4, each of the four vehicle wheels LF, RF, LR and RR must be each capable of being turned or steered relative to the vehicle frame. When the four-wheel crab steering mode is selected, each of the three slave steerable wheels (other than RF) is turned by some angle relative to the vehicle frame depending on the turning of the master wheel. For example, in FIG. 4 the solid lines for the steerable wheels LF, RF, LR and RR indicate the longitudinal or straight ahead steerable wheel positions. Similarly, an oblique steering position designated by the angle A is also shown, and it is indicated that each of the four steerable wheels must all turn by the same angle A for oblique or crab steering. Similarly, the second alternative position for the four steerable wheels shown in FIG. 4 represents the lateral or sideways steering of the vehicle in which each of the four steerable wheels are rotated by 90° relative to the vehicle frame for sideways movement of the vehicle. Thus, a feature of the invention is that, for crab steering, each of the slave steerable wheels can be made to turn approximately through the same angle to achieve the desired turning position.

Although the straddle crane vehicle described with reference to FIG. 1 only includes two steerable front wheels 14 and 16, it is readily possible to include further means in the vehicle of FIG. 1 so that the two rear wheels 18 and 19 thereof are also controllably steerable wheels. For example, the steering or turning position of the wheels 18 and 19 could be controlled by appropriate hydraulic and mechanical means not shown in FIG. 1 but comparable to the means 29, 33 and 30, 34 for the steerable front wheels 14 and 16 as shown in FIG. 1, the control of which will be discussed.

Figure 5:
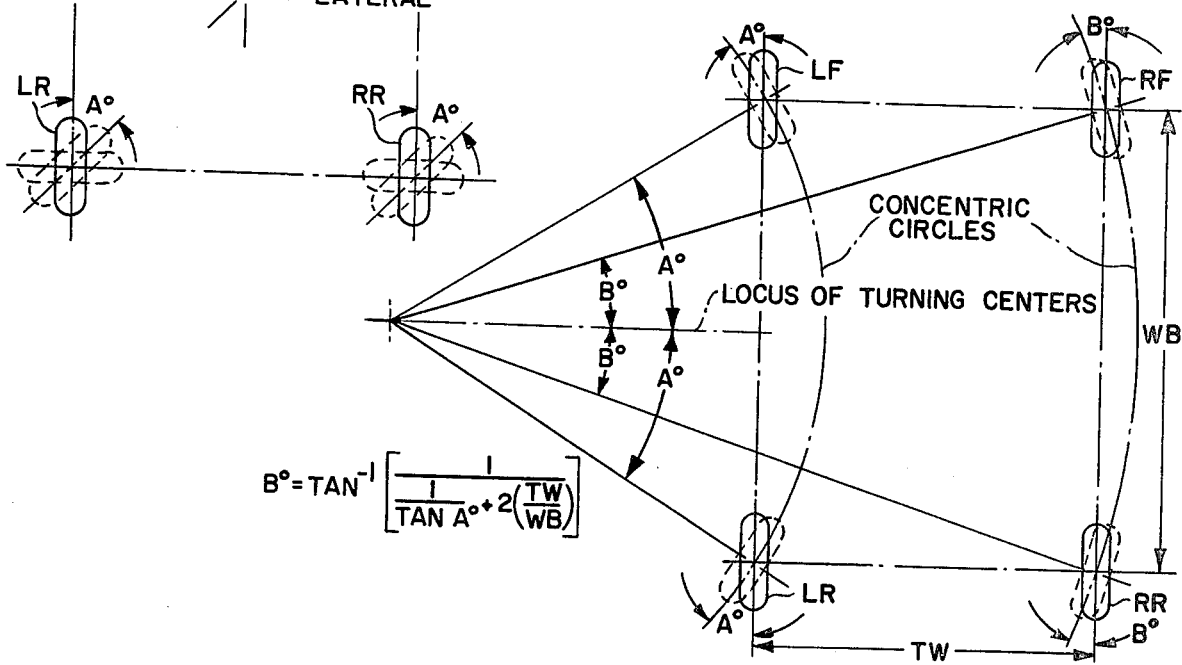
FIG. 5 is a wheel-turning diagram similar to FIG. 4 but illustrating the geometry of four-wheel coordinated steering according to the invention in a vehicle of the type described.

FIG. 5 is a still further wheel-turning diagram but illustrating the geometry of four-wheel coordinated steering. As shown in the case of the four-wheel crab steering of FIG. 4, each of the four wheels LF, RF, LR and RR in FIG. 5 is capable of being turned or steered at some angle relative to the vehicle frame for four-wheel coordinated steering. When four-wheel coordinated steering is implemented, for example, in a leftwardly turning direction as shown in FIG. 5, the set of wheels LF and LR on the inside of the turn must each turn by equal magnitude, but oppositely directed angles A, while the set of wheels RF and RR on the outside of the turn each turn by the equal magnitude but oppositely directed angles B. In other words, the sets of wheels on a given side of the vehicle must turn by equal magnitude but oppositely directed angles in a four-wheel coordinate steer. As further illustrated in FIG. 5, the optimum relationship between the angles A and B must be such as to define two concentric circles having a common turning center, and such that the two concentric circles are respectively tangent to centerlines through the wheels on the inside and on the outside of the turn. Also, the locus of the common turning centers for the four-wheel steer coordinated turn is preferably located on a straight line which perpendicularly bisects lines joining the centers of the steerable wheels on the respective sides of the vehicle frame. Simply stated again, each of the slave wheels assumes an axis of travel normal to the line drawn through the center and the common locus of turning center.

Figure 6:
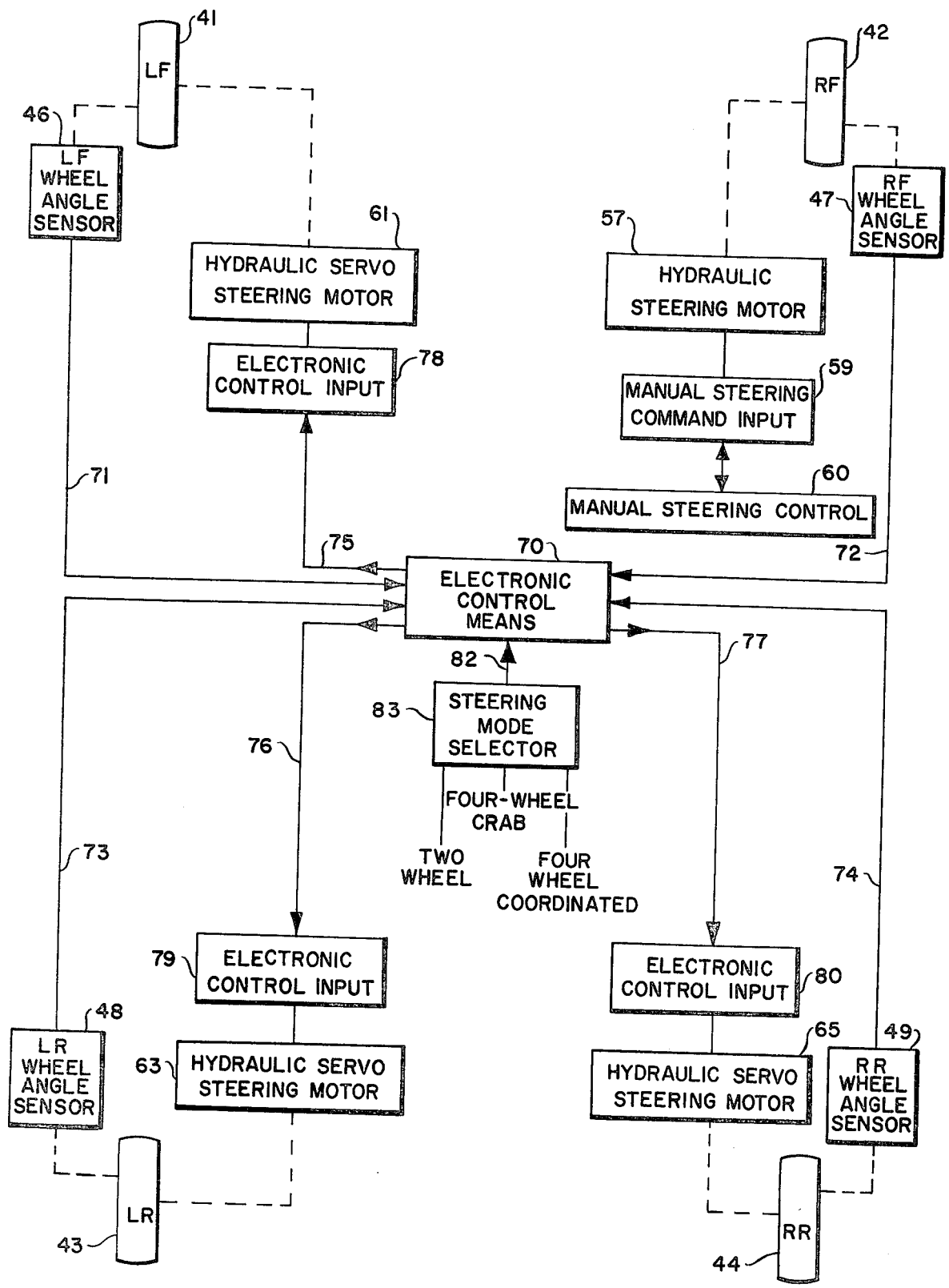
FIG. 6 is a partial schematic, partial block diagram of the electro-hydraulic system according to the invention.

In a preferred embodiment of the hydraulic steering system according to the present invention, hydraulic means and electronic control means are provided as shown in FIG. 6 to permit a vehicle operator to alternatively select or reselect a two-wheel steering mode, a four-wheel crab steering mode, or a four-wheel coordinated steering mode.

In FIG. 6, four steerable wheels 41, 42, 43 and 44 of a vehicle are shown corresponding to the wheels LF, RF, LR and RR of FIGS. 3-5. Wheel angle sensors 46, 47, 48 and 49 are respectively associated with each wheel 41-44 to detect the turned position or steering angel of the steerable wheels relative to the vehicle frame and to generate analog signals representative thereof. A hydraulic steering motor 57 controls the turned position or steering angle of the master steerable wheel 42. The hydraulic steering motor 57 has associated with it a means 59 for accepting steering command input signals from the operator. The means 59, in turn, is connected through linkages to a manual steering control 60 such as a steering lever or a steering wheel at an operator's station in the vehicle. Because wheel 42 is the master steerable wheel, it is the only steerable wheel under the direct control of the operator.

A hydraulic servo steering motor 61 is associated with the steerable wheel 41 to control the steering angle of the wheel 41 relative to the vehicle frame. Similarly, a hydraulic servo steering motor 63 is associated with the steerable wheel 43 and a hydraulic servo steering motor 65 is associated with the steerable wheel 44. Each of the servo steering motors 61, 63 and 65 is thus indirectly controlled by the electronic control unit 70 as will be discussed.

An electronic control means 70 receives signals representative of the wheel or steering angle of each of the steerable wheels 41-44 over leads 71-74 from the wheel angle sensors 46-49 and thereby is able to "know" the steering angle of each of the steerable wheels. The electronic control means 70 provides appropriate electrical output signals over signal lines 75, 76 and 77 respectively to electronic control input means 78, 79 and 80, respectively associated with the hydraulic servo steering motors 61, 63 and 65 as shown. The hydraulic servo steering motors are controlled by electrical signals from the electronic control means 70 provided through the respective electronic control input means.

In a preferred embodiment, the electronic control means 70 is connected by a means 82 to a steering mode selector means 83 as shown in FIG. 6. The steering mode selector preferably permits alternative selection and reselection of the two-wheel steering mode, the four-wheel crab steering mode, and the four-wheel coordinated steering mode, each as previously described with reference to FIGS. 3-5. Appropriate transfer functions are implemented and switchably selected within the electronic control means 70 to provide the necessary control signals.

When the four-wheel crab steering mode is selected by the manual operator, the electronic control means 70 causes appropriate electrical signals to be provided to the hydraulic servo motors 61, 63 and 65 so that each of the four steerable wheels turns by the same angle, and so the steering angles of the steerable slave wheels 41, 43 and 44 correspond to the steering angle for the master steerable wheel 42 as set by the steering command. On the other hand, if the two-wheel steering mode or four-wheel coordinated steering mode is selected, the electronic control means 70 causes appropriate electrical signals to be provided to the hydraulic servo steering motors so that the previously described optimum relationships are maintained between the angles A and B over the normal range of manual steering commands. Of course, when the two-wheel steering mode is selected, the electronic control means 70 causes the hydraulic servo steering motors 63 and 65 to maintain or lock the steerable rear wheels 43 and 44 into the zero steering angle or straight ahead position as shown in FIG. 3 for LR and RR.

Figure 7:
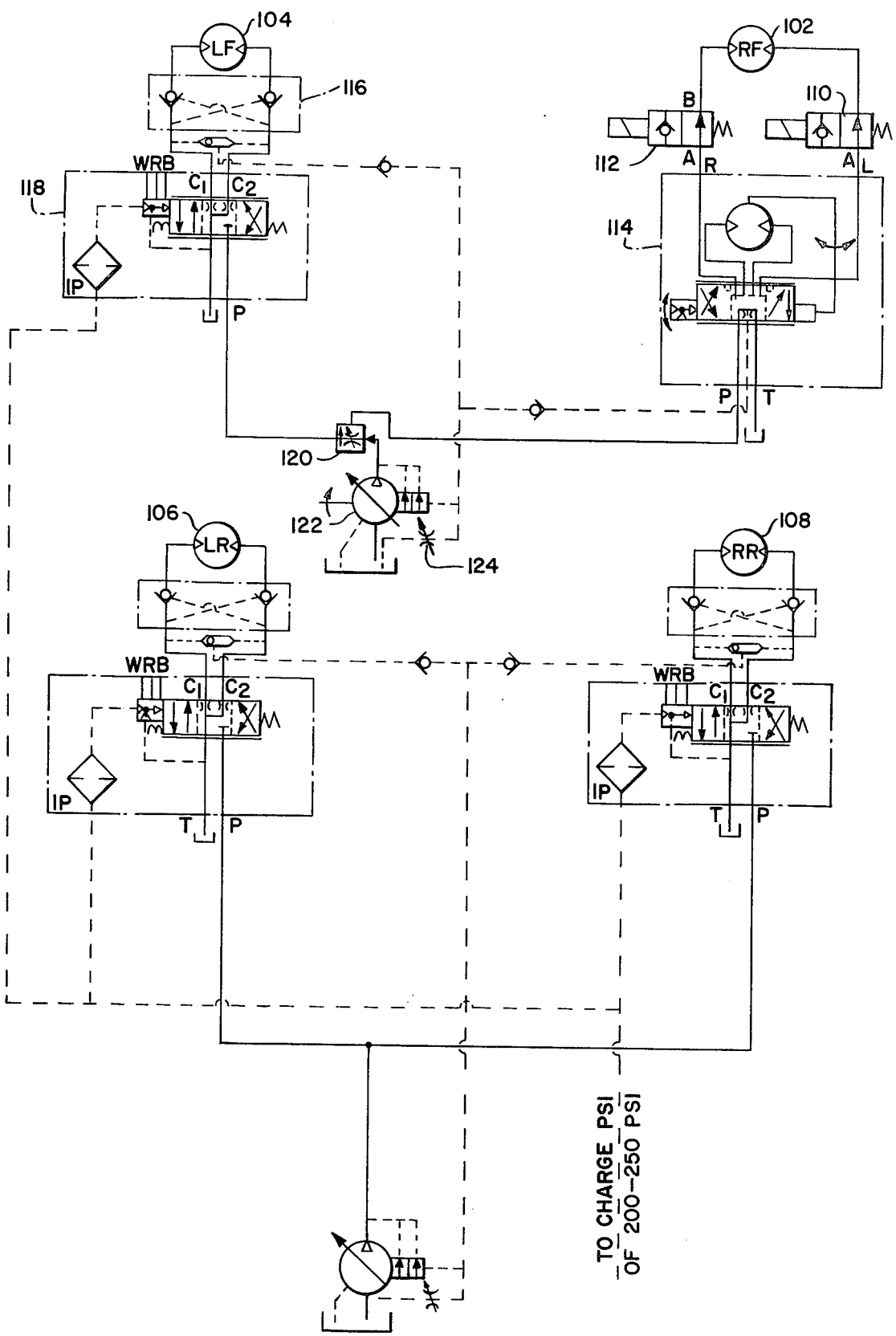
FIG. 7 is a detailed symbolic diagram of the presently-preferred hydraulic system for implementing the steering system according to the invention.

FIG. 7 is a hydraulic circuit diagram in schematic for the hydraulic circuit utilized in implementing the steering characteristics of the present invention. FIG. 7 utilizes USA standard graphic symbols for fluid power diagrams of the type published by the American Society for Mechanical Engineers (ASME). The nature and functions of the elements of FIG. 7 not specifically mentioned herein, may be determined by recourse to publications of the ASME on standard symbols and the functioning of individual components is within the skill of the art.

Hydraulic motors, actuators or pumps 102, 104, 106 and 108 are respectively connected to the right front, left front, left rear, and right rear wheels of the four-wheel embodiment described for use in individually turning the steering pinion of each wheel. The motor 102 is controlled by the operator and is the master or controlling motor for varying the wheel position of the right front wheel. Conversely, the motors 104, 106, and 108 are slave steering motors for coordinating the steering of the remaining slave wheels under the control of the electrical circuitry 70 as discussed in connection with FIG. 6 and as will be described in connection with FIG. 8. Suitable motors are available in the art designated as the CharLynn "S" series and bearing a part number 103-1299-007.

The circuit for the master driving wheel 42 includes a pair of solenoid operated valves 110 and 112 which are used to electro-hydraulically set maximum and minimum steering angle stops when the vehicle is in a two-wheel steering mode. Physical stops generally cannot be used because of vehicle requires greater turning angles than when in the four-wheel steering mode. Specifically, the valves 110 and 112 are two-way, two-position poppet-type solenoid valves which are normally open from A to B. When either of the valves is energized, the A to B passageway is blocked and the B to A passageway is in a free flow condition. Suitable valves are available from Racine, under part number MA-06-E-U-N-O-12EDC.

The hydraulic control unit for the master wheel 42 also includes a metering type steering control valve 114 for metering the hydraulic flow to the motor to control the degree of turn of the motor. The metering type steering control valve is under the control of the operator and its simplest form causes left or right movement of the right front wheel 42 in accordance with the desired direction of travel.

The hydraulic circuitry for the three remaining valves is similar so that only the hydraulic circuitry for the left front wheel will be specifically described. The motor 104 is in hydraulic circuit with a pilot operated check valve 116 which is used to hydraulically isolate the actuator or motor from a master servo valve 118 when the vehicle is in a neutral position or when there is no error signal from the electrical circuitry to cause a change in position of the left front wheel. The steering control valve is available from CharLynn under part number PN213-1015. The cross pilot check or check valve 116 is available from Fluid Controls under part number 4KK32-N-4-S. Similarly, the servo valve 118 is available from Dynex under part number TS5NN-NN-OO.

As will be discussed in connection with other figures, the servo control valve 118 is controlled electronically in response to the position sensed of the right front master wheel 42 to cause a correcting movement of the left front wheel 41 (or the other wheels 43 and 44) to assume and maintain the optimum steering condition.

A plurality flow divider 120 is provided in circuit with the steering control valve 114 or the electronically controlled servo valve 118, to insure that adequate hydraulic fluid is supplied to the servo valve 118 during all turning modes. The priority flow divider 120 is in hydraulic circuit with a load sensing piston pump 122 which is a flow and pressure compensated open circuit-type pump. The pressure compensator adjustment and load sensing differential may be changed. A suitable pump for this purpose is available from Sundstrand under part number PNPV15-SA3-C-L-P-40.

Figure 8:
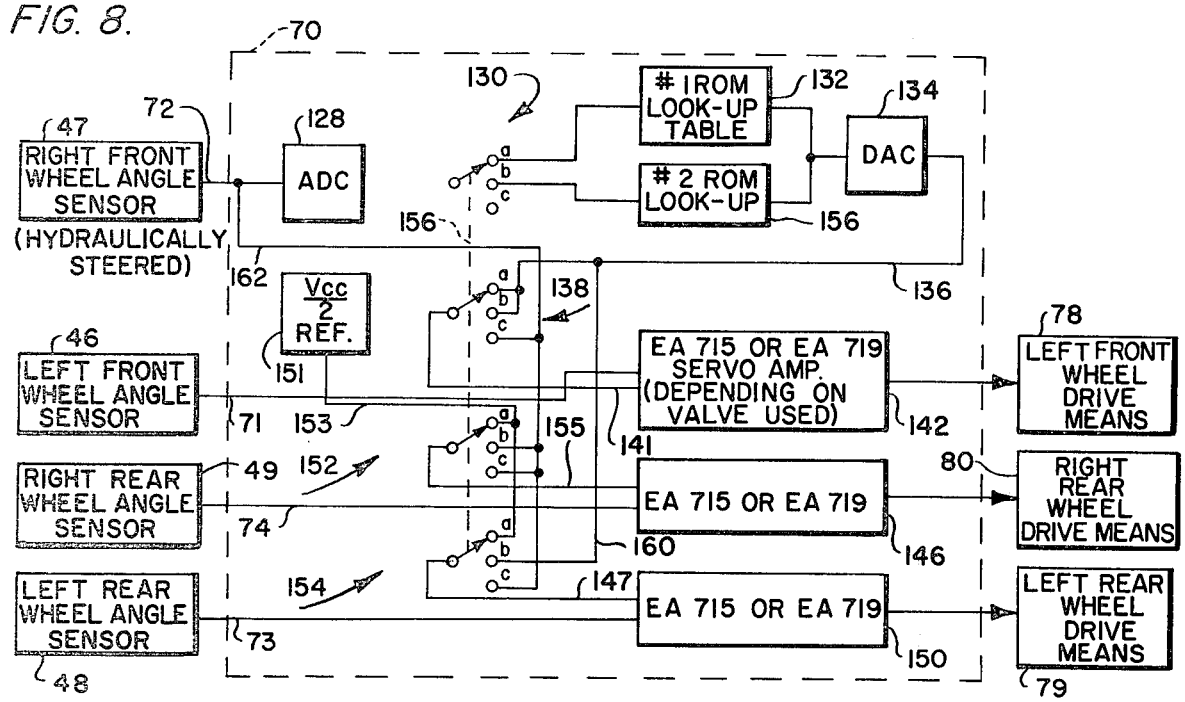
FIG. 8 is a functional block diagram of the presently-preferred electrical system for implementing the steering system according to the invention.

The details of the connections to actuate the various components are not necessary to an understanding of the invention when the operation of the circuit of FIG. 7 is considered in connection with FIG. 8.

FIG. 8 is a block diagram showing the electrical components of a control circuit 70 (shown in phantom outline) cooperating with wheel angle sensors 46-49, the mounting details of which are discussed in connection with FIGS. 9 and 10, for driving the servo valves 118 on any of the slave wheels 41, 43 and 44.

A plurality of wheel angle sensors 46–49 are provided, one for each steerable wheel of the system. Specifically, the hydraulically steered right front wheel includes a wheel angle sensor 47 while the left front, left rear, right rear and left rear wheels include wheel angle sensors 46, 49 and 48, respectively, as shown also in FIG. 6. Each of the wheel angle sensors provides an analog signal representative of the deviation of the respective wheel position from a reference position, as will be discussed in connection with FIGS. 9 and 10. The output signal from the hydraulically-steered right front master wheel angle sensor 47 is provided on lead 72 to an A/D converter 128 to provide a digitized output signal representative thereof.

A ganged selector mode switch 130 has three tap positions, 130a, 130b, and 130c, and a similar ganged switch is provided in circuit with the outputs of each of the other wheel angle sensors 46, 48 and 49. In the position shown (at tap 130a), the unit is operating as a front wheel steer unit so that the digitized output signal from the A/D converter 128 is provided to a read only memory circuit 132 containing a lookup table to provide a digitized output for determining the degree of incremental control for comparison with the outputs of the wheel angle sensor 46 (in the two wheel steer mode) on the other steerable wheel. The lookup table is developed from data determined by an analysis of FIGS. 2, 3, and 4 to determine at what angle position a particular wheel is at right angles to the turning radius at any particular time. The development of such a table is within the skill of the art according to the principles described here.

The output from the read only memory 132 is provided to a D/A converter 134 which provides an analog output signal on lead 136. Because the unit is in a front wheel steer mode, the signal on lead 136 is fed through a ganged switch 138 set at tap 138a to provide an input on lead 141 to the servo amplifier 142. The electronic control output 78 thus drives the motor 61 on the left front wheel as discussed in connection with FIG. 6. Under these conditions, the left front wheel is turned an amount for correcting its position to assume the optimum steering angle. The servo amplifier 142 is a comparing amplifier which utilizes as its second input the analog output from the left front wheel angle sensor 46 on lead 71. Similarly, the output of the right rear wheel angle sensor 49 is provided on the lead 74 to the input of the servo amplifier 146 which controls the drive to the right rear wheel steering valve while the output from the left rear wheel angle sensor 48 is provided on the lead 73 to an input of the servo amplifier 150 to provide the drive to the left rear wheel steering valve as discussed in connection with FIG. 8.

In the two wheel steering mode, with switch 152 set at its 152a position and switch 154 set at its 154a position, a reference voltage from a source 151, is provided on lead 153 to the other input of each amplifier 146 and 150 on leads 155 and 147, respectively. The net result is that the angular position of the rear wheels is "locked" into a position determined by a comparison of the reference voltage to the sensed wheel angle. If either rear wheel in the two wheel steer mode varies, a correcting signal is provided to bring the wheel to its preferred fixed position, as discussed in connection with FIG. 2.

For coordinated steering, the switches 130 and 138, described above, and the switches 152 and 154, all of which are ganged together as shown by the dash line 156, are moved to their center most position, specifically to the taps 130b, 138b, 152b and 154b. In this position, the steering control 70 operates for coordinated steering. In that instance, the digitized output from the A/D converter 128 is provided to a second lookup table 156 having an output connected to the D/A converter 134 which output is provided, for the switch settings discussed, as an input to the servo amplifier 142 on lead 141 and also to the input of the servo amplifier 150 on the lead 160. Simultaneously, the analog output signal from the right front wheel angle sensor 47 is provided on a lead 162 to the center tap 152b on the switch 152 to an input of the servo amplifier 146. In this mode, therefore, the right rear wheel position is directly compared on an analog basis with the output from the right front wheel angle sensor to drive the right rear wheel accordingly, while the left rear wheel is driven by a comparison of the converted digitized output from the converter 134. By appropriate comparisons, the optimum wheel angles for all the wheels in a coordinated steering can be selected, either empirically or by formulation.

As previously explained in connection with FIGS. 2–4, the unit can also operate in a crab steering mode. In the crab steering mode, the ganged switches 130, 138, 152 and 154 are each respectively set to the tap 130c, 138c, 152c and 154c. When so set, the converter 128, tables 132 and 156 and converter 134 are not used, by virtue of the open connection to tap 130c.

The output from the master right front wheel angle sensor 47 is provided on lead 162 to an input of the ampliier 142 on lead 141, to an input on the amplifier 146 on lead 155, and to the input of the amplifier 150 on the lead 157. In this mode, the analog signals are directly compared to produce the error signal which drives the slave wheels by circuits 78, 80 and 79.

If more than four wheels are used, the circuit of FIG. 8 can be expanded and hard wired accordingly to slave all wheels other than the master wheel and to operate in a crab steering mode.

The particular electronic control package 70 depicted in FIG. 8 is commercially available from Gradline, Inc., for example, as part number 0404-091.

Figure 9:
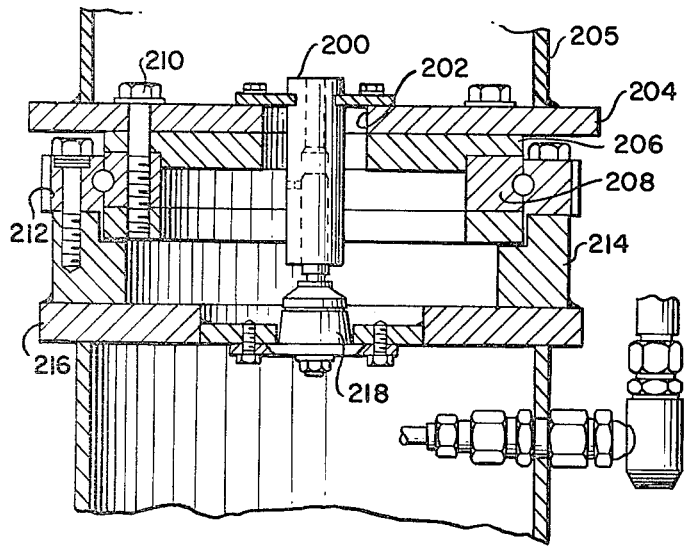
FIG. 9 is a side cross-sectional view of a wheel angle sensor mounted in the caster assembly of a steerable wheel for producing an electrical signal representative of the angular position of the wheel relative to a reference position.

FIG. 9 is a cross-sectional view of a representative wheel caster. FIG. 9 shows a wheel angle sensor 200 fixedly located in an opening 202 in a plate 204 secured to the frame 205 of the vehicle. A support member 206 and its associated bearing 208 are fixedly secured as by a fastener 210 to the plate 204. A bearing 212 is secured to a member 214 which in turn is secured to a hub 216 holding a rotatable portion 218 of the position sensor 200 disposed therein as will be discussed in connection with FIG. 10. The members 212, 214, 216 and 218 are free to rotate relative to the members 204, 206 and 208.

Figure 10:
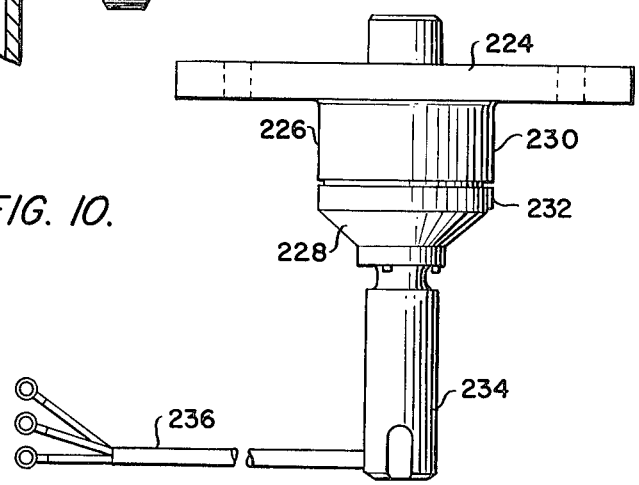
FIG. 10 is an elevational plan view of the wheel angle sensor shown in FIG. 9.

As best seen in FIG. 10, the wheel angle sensor comprises a mounting plate 224 and a first body member 226 which is rotatable relative to a second body member 228. Each of the body members 226 and 228 include null index marks 230 and 232 respectively. A rotatable shaft 234 is fixedly secured to the member 228 and provides an output from the electrical leads 236.

In function, the wheel angle sensor operates as a potentiometer to provide an electrical analog signal depending upon the rotational deviation between the null index marks 230 and 232 on the relatively rotatable members 236 and 228.

The wheel angle sensors are available from Gradline, Inc., for example, under part number 6522-227-003, -004, -004, -006 which are alternatively respectively front wheel sensors and rear wheel sensors. The details of mounting and the specific structural details are set forth in great detail with the understanding that the wheel sensor can be adapted to steerable casters by a number of means so long as the end result is to provide an analog signal representative of the variation between the index marks on the relatively rotatable position sensor.

As can be clearly understood, each of the wheels contains a wheel sensor of the type described in connection with FIGS. 9 and 10 which wheel angle sensors are those referred to in the discussion of FIG. 8 by the reference numerals 46-49 respectively, as well as in FIG. 6. Thus, the hydraulic steering system has been described for electronically controlling slave wheels in a vehicle according to the angular position of the wheels.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of equivalents of the claims are therefore intended to be embraced therein.

What is claimed is:

1. A steering system for a vehicle, said system comprising:
   a master steerable wheel;
   means for manually steering said master steerable wheel;
   at least one slave steerable wheel;
   means for sensing the angular position of each of said steerable wheels and providing electrical signals representative thereof;
   control circuit means for receiving said electrical signals and producing at least one control signal;
   means for steerably controlling said slave wheel in response to said control signal to assume an optimum turning position.

2. The system as set forth in claim 1 wherein said at least one slave steerable wheel consists of three slave steerable wheels connected to a vehicle frame, further including means for selectively controlling said control signal to operate in one of at least the following three modes;
   (a) a two wheel steering mode wherein one of said three slave steerable wheels is steerable controlled relative to the master steerable wheel with the remaining slave steerable wheels locked in position;
   (b) a steering mode wherein the steering of all slave steerable wheels is controlled in response to the sensed angular position of said master steerable wheel; or
   (c) a crab steering mode wherein the steering of all slave steerable wheels is controlled in response to the sensed angular position of the master steerable wheel to be substantially angularly identical to the master steerable wheel.

3. A steering system for a vehicle, said system comprising:
   a master steerable wheel; at least one slave steerable wheel;
   hydraulic motor and circuit means for steering each of said master or slave steerable wheels;
   wheel angle sensor means for each of said master or slave steerable wheels;
   means for controlling the steering of said master steerable wheel in response to a command from an operator of a vehicle, said steering means causing said hydraulic motor of said master steerable wheel to change the angular position of said master steerable wheel; and
   electrical control circuit means responsive to an output signal from said wheel angle sensor means associated with said master steerable wheel to provide a control signal to each of said hydraulic motor and circuit means associated with said slave steerable wheels to cause each of said slave steerable wheels to assume an optimum position, said control signal being dependent upon a signal received from said wheel angle sensor means on each of said master or slave steerable wheels.

4. The system as set forth in claim 3 wherein said at least one slave steerable wheel consists of three slave steerable wheels connected to a vehicle frame and further including means for selectively controlling said control signal to operate in one of at least the following three modes:
   (a) a two wheel steering mode wherein one of said three slave steerable wheels is steerable controlled relative to the master steerable wheel with the remaining slave steerable wheels locked in position;
   (b) a steering mode wherein the steering of all slave steerable wheels is controlled in response to the sensed angular position of said master steerable wheel; or
   (c) a crab steering mode wherein the steering of all slave steerable wheels is controlled in response to the sensed angular position of the master steerable wheel to be substantially angularly identical to the master steerable wheel.

* * * * *